（12）United States Patent
Martin et al.

(10) Patent No.: US 9,237,000 B2
(45) Date of Patent: Jan. 12, 2016

(54) TRANSCEIVER CLOCK ARCHITECTURE WITH TRANSMIT PLL AND RECEIVE SLAVE DELAY LINES

(75) Inventors: Aaron Martin, El Dorado Hills, CA (US); Hon Mo Law, Beaverton, OR (US); Ying Zhou, Portland, OR (US); Joe Salmon, Placerville, CA (US); Derek M. Conrow, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 1602 days.

(21) Appl. No.: 11/471,109

(22) Filed: Jun. 19, 2006

(65) Prior Publication Data

US 2007/0291828 A1    Dec. 20, 2007

(51) Int. Cl.
| H04B 1/38 | (2015.01) |
| H04L 5/16 | (2006.01) |
| H04L 7/00 | (2006.01) |
| H04L 7/033 | (2006.01) |

(52) U.S. Cl.
CPC ............. *H04L 7/0008* (2013.01); *H04L 7/0025* (2013.01); *H04L 7/033* (2013.01)

(58) Field of Classification Search
CPC ...... H04L 7/0008; H04L 7/0025; H04L 7/033
USPC .................. 375/219, 295, 316, 376
See application file for complete search history.

(56) References Cited

U.S. PATENT DOCUMENTS

| 6,414,528 | B1 * | 7/2002 | Usui ............................. 327/158 |
| 6,535,988 | B1 | 3/2003 | Poisner |
| 6,715,094 | B2 | 3/2004 | Jacobs |
| 7,038,508 | B2 | 5/2006 | Parker et al. |
| 7,154,301 | B2 | 12/2006 | Levin |
| 7,157,950 | B2 | 1/2007 | Law et al. |
| 7,190,754 | B1 * | 3/2007 | Chang et al. .................. 375/373 |
| 7,339,403 | B2 | 3/2008 | Chen et al. |
| 7,382,843 | B2 * | 6/2008 | Koch et al. ..................... 375/354 |
| 7,404,099 | B2 | 7/2008 | Huang et al. |
| 7,439,788 | B2 | 10/2008 | Law et al. |
| 7,545,194 | B2 | 6/2009 | Chen et al. |
| 7,668,524 | B2 | 2/2010 | Law et al. |

(Continued)

OTHER PUBLICATIONS

Wang et al. A 500-Mb/s Quadruple Data Rate SDRAM Interface Using a Skew Cancellation Technique, IEEE Journal of Solid-State Circuits, vol. 36, No. 4, Apr. 4, 2001, pp. 648-657.*

(Continued)

*Primary Examiner* — Freshteh N Aghdam
(74) *Attorney, Agent, or Firm* — Blakely, Sokoloff, Taylor & Zafman LLP

(57) ABSTRACT

A method and apparatus for transceiver clock architecture with transmit PLL and receive slave delay lines. In one embodiment, the method includes the generation of a transmitter (Tx) clock signal by adjusting a control voltage of a voltage controlled oscillator to lock a phase and frequency of Tx clock signal to a reference clock signal. In one embodiment, a frequency of the Tx clock signal is a multiple of a frequency of the reference clock signal. In one embodiment, a slave delay line may be used, including a plurality of variable delay buffers that are configured according to the control voltage to generate a receiver (Rx) clock signal in response to a received clock signal that is synchronized with the reference clock signal. The Rx clock signal may be provided to data recovery logic to sample data. Other embodiments are described and claimed.

14 Claims, 6 Drawing Sheets

(56) References Cited

U.S. PATENT DOCUMENTS

| | | | |
|---|---|---|---|
| 2003/0107411 A1 | 6/2003 | Martin et al. | |
| 2003/0155953 A1* | 8/2003 | Hirata et al. | 327/236 |
| 2003/0188234 A1 | 10/2003 | Casper et al. | |
| 2004/0062319 A1 | 4/2004 | Casper et al. | |
| 2005/0030073 A1* | 2/2005 | Wakayama et al. | 327/156 |
| 2005/0070229 A1 | 3/2005 | Casper et al. | |
| 2005/0200393 A1* | 9/2005 | Furtner | 327/291 |
| 2006/0006918 A1 | 1/2006 | Saint-Laurent | |
| 2007/0149142 A1* | 6/2007 | Law et al. | 455/76 |
| 2007/0164797 A1 | 7/2007 | Law et al. | |
| 2008/0292040 A1* | 11/2008 | Menolfi et al. | 375/376 |
| 2014/0184523 A1 | 7/2014 | McCall et al. | |
| 2014/0266320 A1 | 9/2014 | Conrow et al. | |

OTHER PUBLICATIONS

Kim et al., IEEE, PLL/DLL System Noise Analysis for Low Jitter Clock Synthesizer Design), and further in view of Instant Application's Disclosed Prior Art (hereinafter referred to as IADP, May-Jun. 1994, pp. 31-34.*

Jeongpyo Kim et al., "A 500Mb/s/pin Quadruple Data Rate SDRAM Interface using a Skew Cancellation Technique", WP 24.7, 2000 IEEE International Solid-State Circuits Conference 2000, Digest of Technical Papers, 07803-5853-8/00, © 2000 IEEE, pp. 2 total.

Jeongpyo Kim et al., "A 500Mb/s/pin Quadruple Data Rate SDRAM Interface using a Skew Cancellation Technique", Abstract, Solid-State Circuits Conference, 2000. Digest of Technical Papers. ISSCC. 2000 IEEE International, pp. 1 total.

Sung Ho Wang et al., "A 500Mb/s/pin Quadruple Data Rate SDRAM Interface using a Skew Cancellation Technique", IEEE Journal of Solid-State Circuits, vol. 36, No. 4, Apr. 2001, pp. 648-657.

Bryan Casper et al., "An 8-Gb/s Simultaneous Bidirectional Link with On-Die Waveform Capture", IEEE Journal of Solid-State Circuits, vol. 38, No. 12, Dec. 2003, pp. 2111-2120.

* cited by examiner

US 9,237,000 B2

TRANSCEIVER CLOCK ARCHITECTURE WITH TRANSMIT PLL AND RECEIVE SLAVE DELAY LINES

FIELD

One or more embodiments relate generally to the field of integrated circuit and computer system design. More particularly, one or more of the embodiments relate to a method and apparatus for transceiver clock architecture with transmit PLL and received slave delay lines.

BACKGROUND

As chip-to-chip input/output (I/O) rates increase to accommodate bandwidth demand, it is important that multi-gigabit links consume low power, have a small area, and are robust and easily testable. As a result, such multi-gigabit links require an efficient timing convention. A timing convention may govern when a transmitter drives symbols onto a symbol line and when they are sampled by a receiver. A timing convention may be periodic, with a new symbol driven on a signal line at regular time intervals, or aperiodic, with new symbols arriving at irregular times. In either case, a method is required to encode when the symbols arrive so that the receiver samples each symbol exactly once during its valid period. For aperiodic signals, an explicit transition, such as a stroke signal, is required to signal the arrival of each symbol. This transition is generally provided by a separate clock line that may be shared amongst several signals.

One technique to enable high aggregate bandwidths is simultaneous bi-directional (SBD) differential signaling. SBD signaling operates by transmitting bits simultaneously in both directions over a single transmission line. Bits travel in one direction on the forward-traveling wave and in the other direction on the reverse-traveling wave. The line is terminated at both ends to eliminate coupling between the two bit streams. Although, the effective pin and wire density of the signaling system can be doubled by using SBD signaling, this signaling conventional introduces a new noise source crosstalk between the forward and reverse traveling waves.

A point-to-point link may use SBD signaling to transmit data simultaneously in both directions, where a forwarded clock is provided in conjunction with the data to enable source synchronous signaling. As known to those skilled in the art, source synchronous signaling is a communications mechanism where a clock is forwarded along with the data, obviating the need for distribution of a global clock. Shared source synchronous clocking may be used to minimize clocking power per bit, reduce complexity and latency, and possibly eliminate the need for data coding with its associated bandwidth overhead.

A common alternative to source synchronous clocking is to embed a clock signal into the data using coding techniques and then extract the clock at the receiver using a clock-data recovery (CDR) circuit. This clock recovery method requires extra latency due to the need for clock-data encoding and decoding. Additional power is consumed because of the added CDR circuitry and the need to over-sample for phased detection. Conversely, source synchronous clocking bypasses the need for this real-time tracking circuitry and data coding, since a significant portion of the transmit jitter and clock phase drift are common between the clock and parallel data lines.

A timing convention of the point-to-point link may operate either according to an open loop or a closed loop. In an open loop system, the frequencies and delays associated with system timing are not subject to control. The system is designed to tolerate the worst case variation in these parameters. With closed loop timing, on the other hand, one or more system timing parameters, delays and frequencies, are actively controlled. The system measures a timing parameter, such as skew, and uses feedback control to adjust the variable parameters to reduce the skew.

Accordingly, closed loop timing can greatly decrease the timing uncertainty in a system; and hence, increase the maximum data rate. Conventionally, closed loop timing for a transceiver clock architectures of a point-to-point link generally require both a delayed lock loop (DLL) and a phased lock loop (PLL) for generation of both receiver clocks and transit clocks.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for transceiver clock architecture with transmitter (Tx) phase locked loop (PLL) and receiver (Rx) slave delay lines (SDL) are described. In one embodiment, the method includes the generation of a transmitter (Tx) clock signal that is locked to a reference clock according to a control voltage. In one embodiment, the Tx clock signal is generated by adjusting a control voltage of a voltage controlled oscillator to lock a phase and frequency of Tx clock signal to a reference clock signal. In one embodiment, a frequency of the Tx clock signal is a multiple of a frequency of the reference clock signal.

In one embodiment, a simplified transceiver clock architecture includes a slave delay line having a plurality of variable delay buffers, which are configured according to the control voltage. Once configured, the slave delay line may generate a receiver (Rx) clock signal in response to a received clock signal. The Rx clock signal may be provided to data recovery logic to sample data according to the Rx clock signal that is adjusted by the slave delay line to synchronize with the reference clock signal.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

Figure 1:
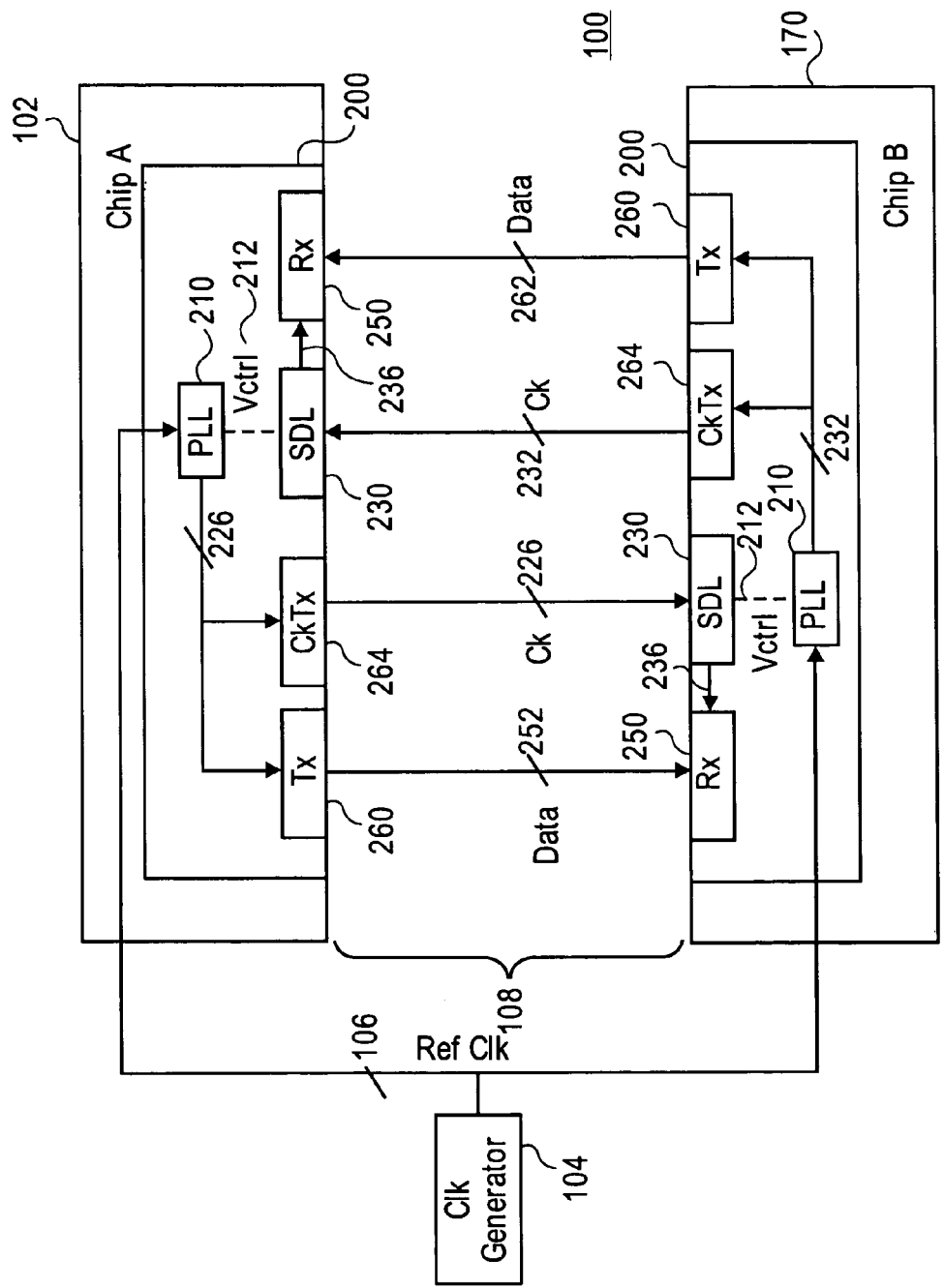
FIG. 1 is a block diagram illustrating a computer system, including a transceiver clock architecture with a transmitter phase locked loop (PLL) and one or more receiver slave delay lines, in accordance with one embodiment.

FIG. 1 is a block diagram illustrating a computer system 100, including a first chip (Chip A) 102 and a second chip (Chip B) 170, where each chip includes a transceiver 200 with a transmitter phased locked loop (PLL) 210 and one or more receiver slave delay lines (SDL) 230, according to one embodiment. Representatively, chip 102 and chip 170 are coupled together via interconnect 108. In one embodiment, interconnect 108 may refer to a point-to-point link for enabling simultaneous bi-directional (SBD) differential signaling.

As shown in FIG. 1, interconnect 108 enables transceiver interfaces 200 to operate according to a source synchronous protocol, where a clock is forwarded, along with data, obviating the need for distribution of a global clock. Conventionally, source synchronous interfaces use a PLL to generate a transmitter clock and a separate DLL to generate a receiver clock. These conventional architectures suffer from high area and power consumption, resulting from the two complete closed loop circuits required to implement the PLL to generate the transmitter clock and the separate DLL to generate the receiver clock. The high area and power consumption is consumed by the two complete closed loop circuits with their accompanying filters, phase detectors and support logic.

In contrast to such dual loop architectures, FIG. 1 illustrates a single closed loop transceiver clock architecture 200, which is advantageous from an area and power efficiency perspective. Representatively, each transceiver interface 200 includes a single closed loop implemented as a phase locked loop (PLL) 210 to control clock generation. Representatively, functionality of the transceiver clock architecture, as shown in FIG. 1, requires a single crystal for implementation of clock generator 104 for generation of reference clock signal 106. For ease of understanding, like components between chip 102 and chip 170 are numbered using matching reference numbers.

In the embodiment illustrated, PLL 210 is provided to generate all transmit clocks and to control the delay of multiple slave delay lines (SDL) 230. In one embodiment, PLL 210 may generate multi-phase transmit clocks, whereas SDL 230 generates multi-phase clocks for receiver data recovery. In the embodiment illustrated, PLL 210 generates a transmitter (Tx) clock signal 226/232. In one embodiment, Tx clock signal 226/232 is a high-speed clock signal having a frequency that is a multiple of a frequency of reference clock 106.

Figure 2:
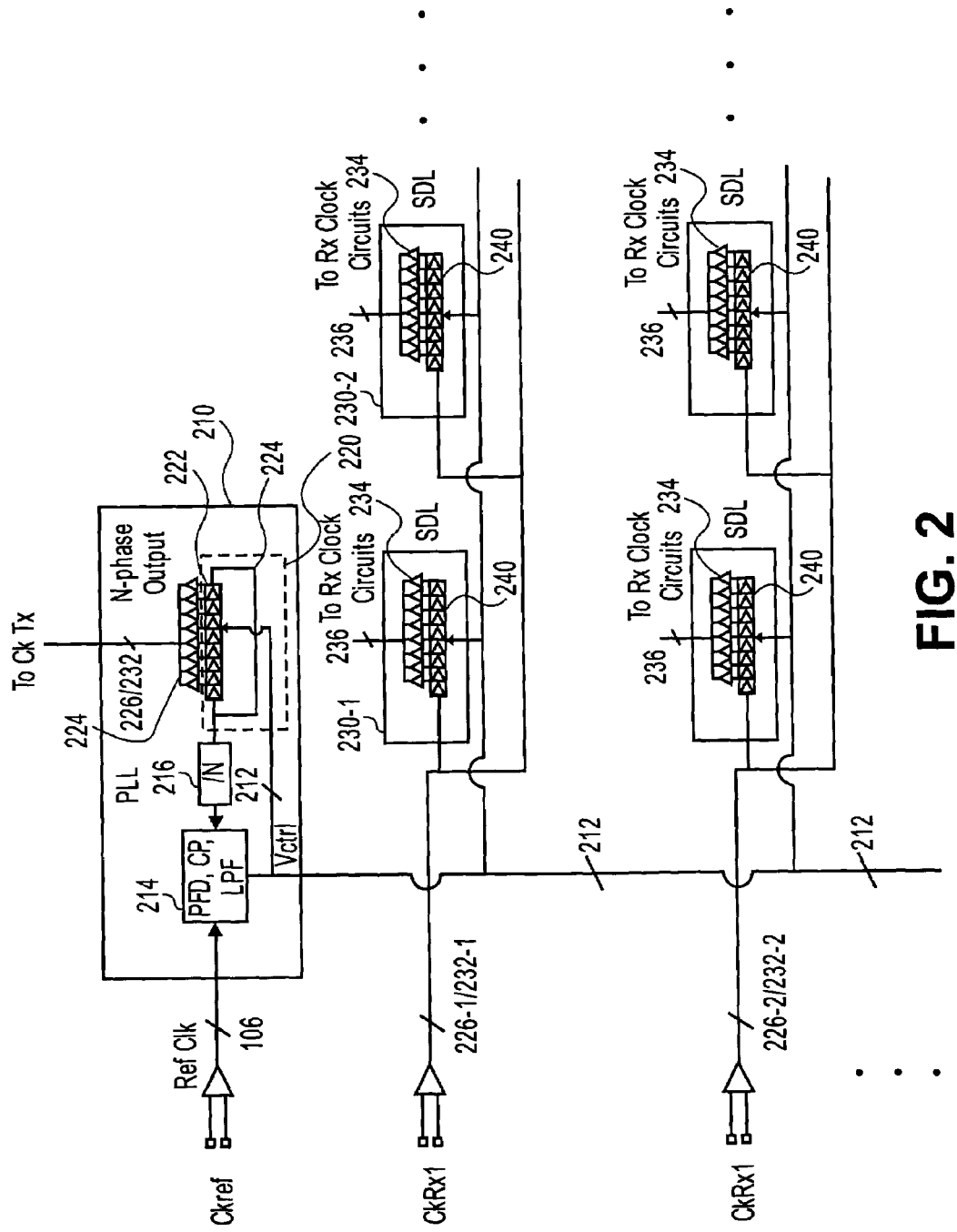
FIG. 2 is a block diagram further illustrating the transceiver shown in FIG. 1, in accordance with one embodiment.

In one embodiment, PLL 210, as further illustrated in FIG. 2, may divide the Tx clock signal 226/232 to match a phase and frequency of a divided Tx clock signal with a phase and frequency of reference clock signal 106 by adjusting a control voltage of a voltage controlled oscillator (VCO). A final value of the control voltage (Vctrl) 212 is passed to slave delay line 230. As described herein, adjusting of Vctrl 212 is performed to generate a frequency and phase lock between Tx clock signal 226/232 and reference clock signal 106.

Representatively, Tx clock signal 226/232 is provided to clock transmitter (CkTx) 264 to enable transmitter (Tx) 260 to transmit data 252/262 according to Tx clock signal 226/232. In response to Vctrl signal 212, SDL 230, which may include a delay cell circuit, including a plurality of delay buffers, may be configured as dictated by the Vctrl voltage 212 to generate a receiver (Rx) clock signal 236, which is provided to receiver (Rx) 250 to enable data recovery of received data 252/262.

FIG. 2 is a block diagram further illustrating PLL 210 and SDL 230, as shown in FIG. 1, according to one embodiment. Representatively, PLL 210 includes correction block 214, which may include a phase and frequency detector (PFD), a charge pump (CP) and a low path filter (LPF). Additional features regarding the PFD, CP and LPF of correction logic 214 are omitted to avoid obscuring details of the various embodiments.

As further shown in FIG. 2, PLL 210 may include a voltage controlled oscillator (VCO) 220 comprised of delay cell circuit 222. In one embodiment, delay cell circuit 222 includes a plurality of variable delay buffers, which are controlled by control voltage (Vctrl) 212. In one embodiment, delay cell circuit 220 includes feedback loop 224 to enable the generation of an oscillation frequency, as desired. Accordingly, in operation, a transmitter or Tx clock signal 226/232 is generated by setting the various delay buffer values according to the Vctrl signal 212. The Tx clock signal 226/232 is then divided by divider circuit 216 to match a frequency of reference clock signal 106.

Representatively, correction circuit 214 adjusts Vctrl signal 212 until a phase and frequency of a divided transmitter clock signal matches a frequency and phase of reference clock signal 106. Once matched, Tx clock signal 226/232 may be provided to clock transmitter circuits 264, as shown in FIG. 1. As further illustrated in FIG. 2, PLL 210 may include phase selection buffer 224, which enables the selection of a signal from the one or more buffers of delay cell circuit 220 to provide a multi-phase, or N-phase, Tx clock signal 226/232.

In the embodiment illustrated, control voltage 212 is provided to slave delay lines 230 (230-1, 230-2, . . . ). In one embodiment, delay cell circuits 240 of each slave delay line 230 are matched with delay cell circuit 222 of VCO 220 of PLL 210. Accordingly, in one embodiment, proper operation requires that SDL 230 is matched to VCO 220 of PLL 210 in all respects, including delay cell circuit design, input edge rate, input swing, output loading and physical layout. Assuming such constraints are met, SDL 230 generates accurate single or multi-phase outputs for phase interpolation and multi-phase clock distribution.

In one embodiment, a frequency of the incoming Rx clock is required to be equal to a frequency of the PLL output for proper multi-phase clock generation. Accordingly, by matching delay cell circuit 240 with delay cell circuit 222 of VCO 220, Rx clock signal 236 generated by each SDL is synchronized to a reference clock frequency to enable proper data recovery.

As further illustrated in FIG. 2, output buffer stage 234 of each SDL enables the generation of a multi-phase output, as dictated by PLL 210, for example, as illustrated with reference to FIGS. 3A and 3B.

Figure 3A:
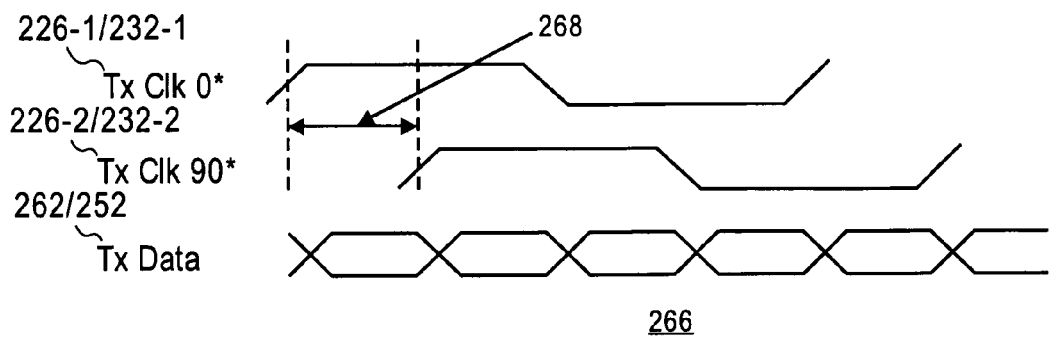
FIGS. 3A and 3B are clock diagrams to illustrate multi-phase transmitter clock generation and multi-phase receiver clock generation for data recovery, according to one embodiment.
Figure 3B:
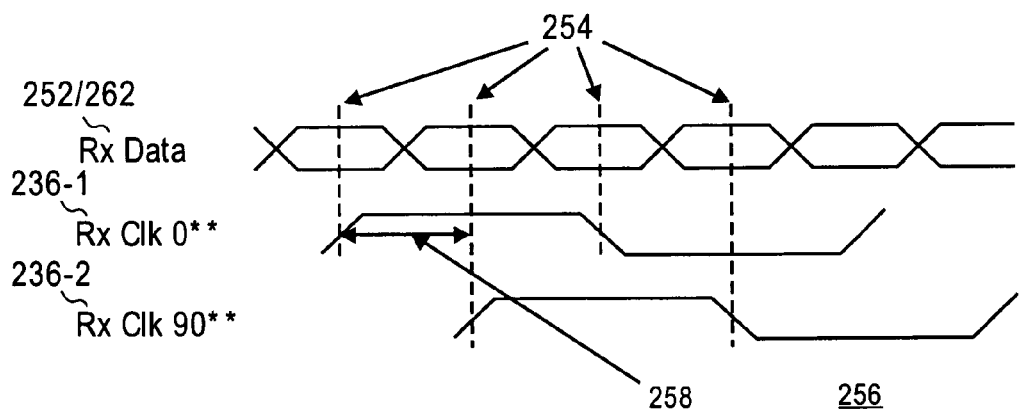

FIGS. 3A and 3B illustrate timing diagrams for multi-phase transmitter clock generation and multi-phase receiver clock generation, according to one embodiment. Representatively, FIG. 3A illustrates timing diagram 262, which includes transmitter clock (TX Clk) 226-1/232-1 having a zero phase and Tx clock 226-2/232-2 having a 90° phase difference from Tx Clk 226-1/232-1. In the embodiment illustrated, delay 268 between Tx Clks 226-1/232-1 and 226-2/232-2 is controlled by PLL 210, as shown in FIGS. 1 and 2. Accordingly, in the embodiment illustrated, quadrature multi-phase clocking is provided to enable data sampling, as shown in FIG. 3B. Although quadrature, multi-phase clocking is shown, any desired phase difference may be provided as desired by the timing convention.

FIG. 3B is a timing diagram 256 illustrating the generation of multi-phase receiver clocks to enable proper data sampling, according to one embodiment. As illustrated, Rx data sample points 254 are required to enable proper data recovery. As shown, Rx clock 236-1 is provided having a zero phase, whereas Rx clock 236-2 is 90° out of phase with Rx clock 236-1. In one embodiment, the delay between Rx clocks (as generated by SDL 230) is controlled by PLL 210. Representatively, data recovery logic of a receiver may sample even data items on the rising edge and falling edge of Rx clock 236-1, while odd data items are sampled on the rising edge and falling edge of Rx clock 236-2.

Figure 4:
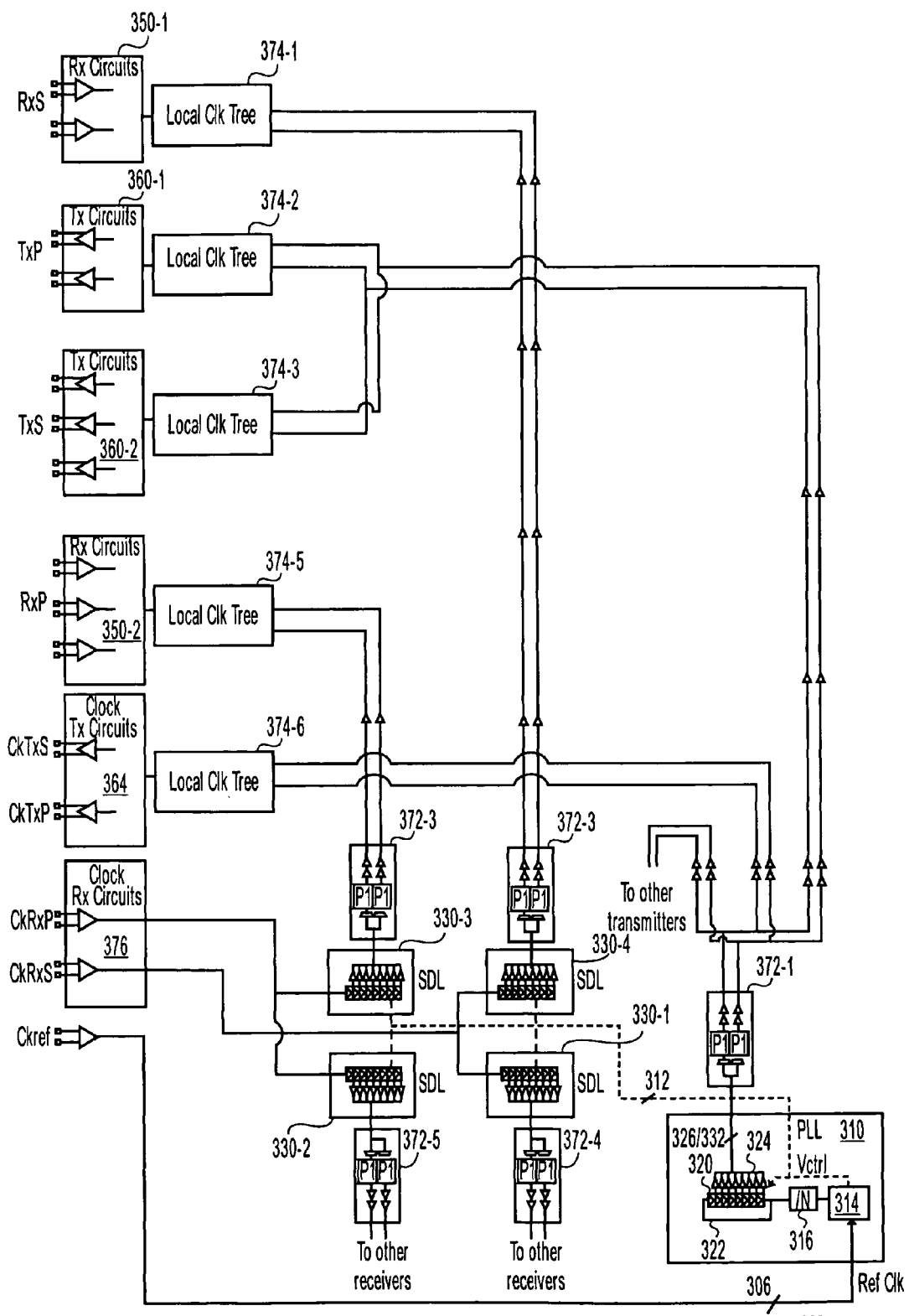
FIG. 4 is a block diagram illustrating a computer system to provide dual phase clocking using a transceiver clock architecture, including a transmitter PLL and one or more receiver slave delay lines, according to one embodiment

FIG. 4 is a block diagram illustrating a computer system 300, including a transceiver clock architecture having a transmit PLL 310 and a plurality of receiver slave delay lines (SDL) 230, according to one embodiment. Representatively, PLL 310 is configured as shown in FIGS. 1 and 2. However, in the embodiment illustrated, a phase interpolator block 372-1 may couple one or more phase interpolators to receive a multi-phase output from PLL 310. In one embodiment, phase interpolator block 372-1 may perform phase interpolation of a multi-phase output for performing deskew. As further illustrated, phase interpolator block 372-1 may drive a local clock tree 374-2 and 374-6 for transmitter circuits 360-1 and 360-2, as well as clock transmitter circuits 364.

As further illustrated in FIG. 4, each SDL 330 (330-1, 330-2, 330-3 and 330-4) is coupled to a respective phase interpolator block 372. Representatively, phase interpolator blocks (372-2, 372-3, 372-4, 372-5) receive a multi-phase output from SDL 330, whereas phase interpolator block 372-1 receives a multi-phase output from PLL 310. In the embodiment illustrated, interpolator blocks 372-2 and 372-3 provide a dual phase clock for local clock trees 374-1 and 374-5. Representatively, local clock trees 374-1 and 374-5 may provide the multi-phase clock to receiver circuits 350-1 and 350-2 to enable data recovery.

Although illustrated to provide a dual phase clock, it should be recognized that the embodiment in FIG. 4 is provided to illustrate one embodiment and should not be interpreted in a limiting sense to dual phase clocking, as the various embodiments may apply to single-phase or multi-phase clocking, as desired for the particular system implementation.

Accordingly, in the embodiment illustrated in FIG. 4, PLL 310 is provided to generate a low jitter transmit clock, as well as to provide a multi-phase output for phase interpolation and dual clock distribution, as well as serving as a master circuit for SDLs 330. Accordingly, utilizing a transceiver interface configuration, for example as shown in FIG. 2, overhead of close loop design is minimized by using a single loop to control both Rx and Tx multi-phase clocking and phase interpolation for deskew.

Figure 5:
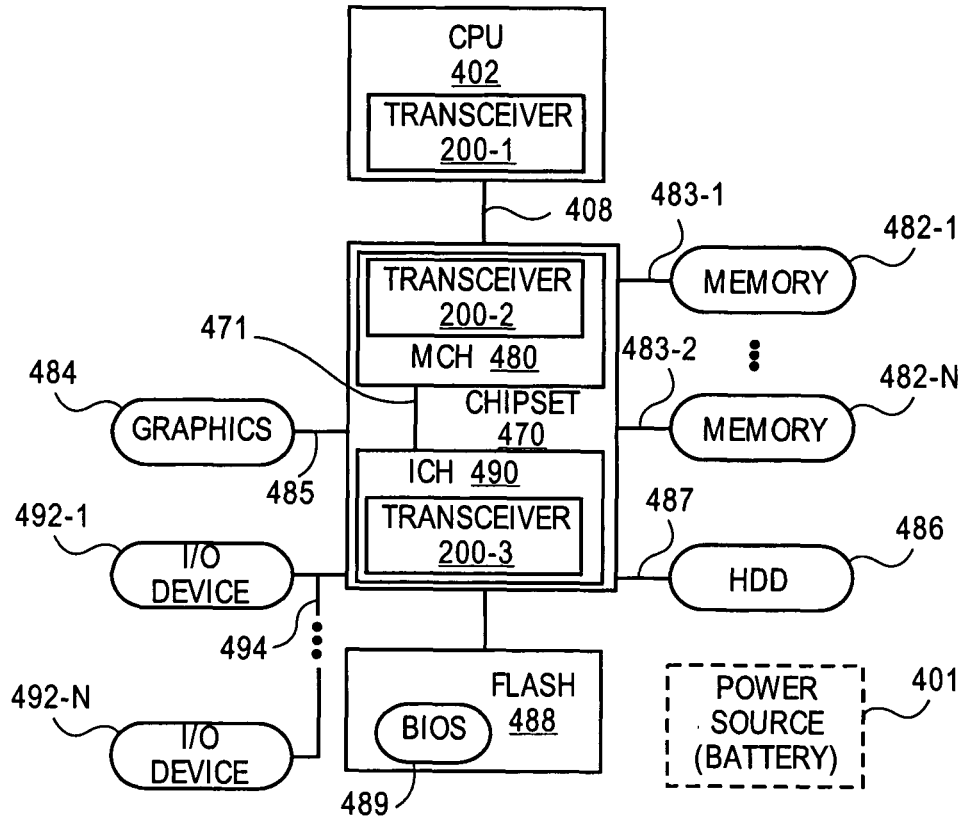
FIG. 5 illustrates a computer system, including a CPU including a transceiver for communicating with a chipset transceiver, for example, as shown in FIGS. 1 and 2, according to one embodiment.

FIG. 5 is a block diagram illustrating computer system 400 including transceiver interface 200 (200-1, 200-2, 200-3) including a transmitter (Tx) PLL and one or more receiver (Rx) slave delay lines (SDL), as shown in FIGS. 1, 2 and 4, in accordance with one embodiment. Representatively, computer system 400 comprises a processor system bus (front side bus (FSB)) 408 for communicating information between processor (CPU) 402 and chipset 470. As described herein, the term "chipset" is used in a manner to collectively describe the various devices coupled to CPU 402 to perform desired system functionality. In one embodiment, CPU 402 may be a multicore chip multiprocessor (CMP). In one embodiment, power source (battery) 401 is provided for operation as a mobile personal computer (MPC) system.

Representatively, chipset 470 may include memory controller hub 480 (MCH) coupled to graphics controller 484 via interconnect 485. In an alternative embodiment, graphics controller 484 is integrated into MCH 480, such that, in one embodiment, MCH 480 operates as an integrated graphics MCH (GMCH). Representatively, MCH 480 is also coupled to main memory 482 (482-1, . . . 482-2) via interconnect 483. In one embodiment, main memory 482 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, chipset 470 includes an input/output (I/O) controller hub (ICH) 490 coupled to MCH 480 via interconnect 471. Representatively, ICH 490 may couple a universal serial bus (USB) link or interconnect 494 to couple one or more USB slots (not shown) to ICH 490. Likewise, a serial advance technology attachment (SATA) 487 may couple hard disk drive devices (HDD) 486 to ICH 490. In one embodiment, basic input/output system (BIOS) 489 stored within flash memory 488 initializes computer system 400. Although chipset 470 is illustrated as including a separate MCH 480 and ICH 490, in one embodiment, MCH 480 may be integrated within CPU 402. In an alternate embodiment, the functionality of MCH 480 and ICH 490 are integrated within chipset 470.

In one embodiment, transceiver 200 may be implemented within computer systems including an MCH integrated within a CPU, an MCH and ICH integrated within a chipset, as well as a system on-chip. Accordingly, those skilled in the art recognize that FIG. 5 is provided to illustrate one embodiment and should not be construed in a limiting manner. In one embodiment, MCH 480 includes transceiver interface 200 for point-to-point link 408.

Representatively, in one embodiment, link 408 may support a serial interconnect protocol link protocol including, but not limited to, common system Interface (CSI), peripheral component interconnect (PCI) Express (PCI-E), SATA, SAS, Fibre-Channel, XAUI or other like serial interconnect. Accordingly, although one or more of the embodiments described herein may be provided with reference to CSI, those skilled in the art should recognize that the embodiments described herein are not limited to serial links, which support CSI, and are therefore applicable to other serial link protocols.

Figure 6:
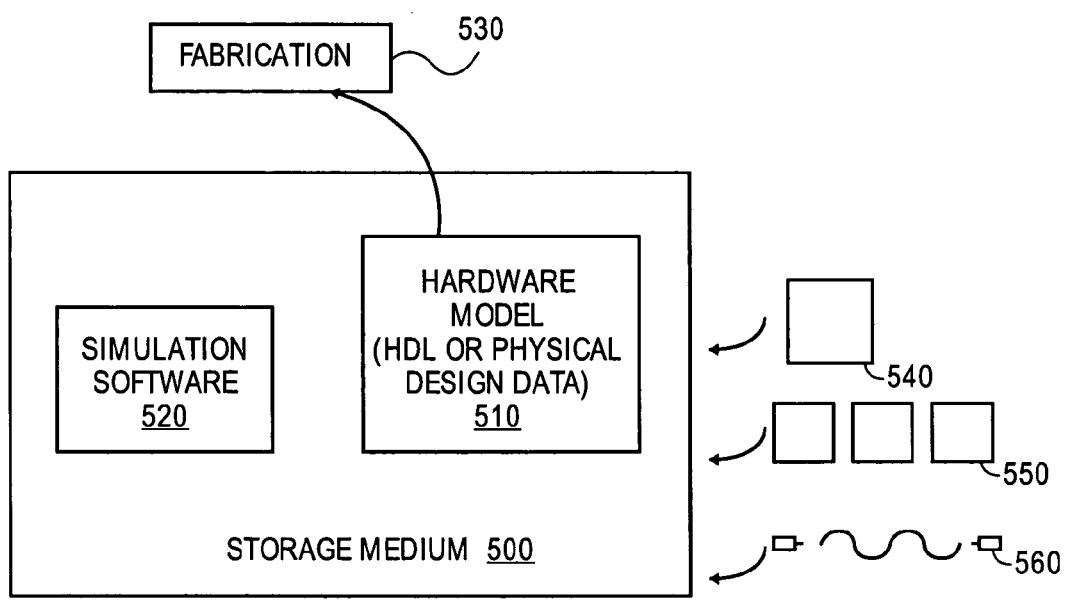
FIG. 6 is a block diagram illustrating various design representations or formats for simulation, emulation and fabrication of a design using the disclosed techniques.

FIG. 6 is a block diagram illustrating various representations or formats for simulation, emulation and fabrication 530 of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 510 may be stored in a storage medium 500, such as a computer memory, so that the model may be simulated using simulation software 520 that applies a particular test suite 530 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. An optical or electrical wave 560 modulated or otherwise generated to transport such information, a memory 550 or a magnetic or optical storage 540, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

ALTERNATE EMBODIMENTS

It will be appreciated that, for other embodiments, a different system configuration may be used. For example, while the system 100 includes a single CPU 402, for other embodiments, a chipset multiprocessor (CMP) system including a plurality of processor cores or a multiprocessor system (where one or more processors may be similar in configuration and operation to the CPU 402 described above) may benefit from the two micro-operation flow using source override of various embodiments. Further different type of system or different type of computer system such as, for example, a server, a workstation, a desktop computer system, a gaming system, an embedded computer system, a blade server, etc., may be used for other embodiments.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. An apparatus comprising:
   a transceiver input-output (I/O) interface comprising:
      a data transmit interface to transmit a transmitted data signal from the transceiver input-output interface;
      a transmit clock signal interface to transmit a transmitted clock signal from the transceiver input-output interface;
      a phase locked loop (PLL) having an oscillator with a first control input, said first control input to receive a control signal to determine a frequency of oscillation of an output signal of said oscillator that is presented on an output of said oscillator, said output of said oscillator coupled to said data transmit interface and said transmit clock signal interface to respectively transmit from said interfaces said transmitted data signal and said transmitted clock signal synchronously with said output signal of said oscillator;
      a receive clock signal interface to receive a received clock signal;
      a receive data interface to receive a received data signal;
      a slave delay line having an input coupled to said receive clock interface to receive said received clock signal and having a second control input that is coupled to said first control input to receive said control signal, said slave delay line to delay said received clock signal in accordance with said control signal, said slave delay line having an output to provide a delayed received clock signal, said output of said slave delay line coupled to said received data interface to receive said received data signal synchronously with said delayed received clock signal;
a first phase interpolator between the oscillator output and at least one of the data transmit interface and transmit clock signal interface.

2. The apparatus of claim 1, wherein the oscillator comprises:
a plurality of delay buffers, where a delay of each buffer is variable and controlled by the control signal and a delay buffer of the slave delay line is matched to a delay buffer of said oscillator.

3. The apparatus of claim 1, wherein the output of the oscillator further comprises a multi-phase output in which different phase oscillator output signals flow from different delay buffers within the oscillator.

4. The apparatus of claim 3, wherein a respective delay of the different delay buffers are controlled by a control voltage.

5. The apparatus of claim 1, wherein the PLL further comprises:
a buffer stage coupled to a delay circuit of the oscillator to enable the PLL to generate a first output signal and a second output signal, wherein a delay between the first output signal and the second output signal is selected to enable multi-phase clocking.

6. The apparatus of claim 1, further comprising:
at least one clock tree coupled to the first phase interpolator to receive a multi-phase clock signal, wherein, the receive data interface is to sample data according to the multi-phase clock signal.

7. The apparatus of claim 1, further comprising:
at least one phase interpolator coupled to the oscillator output to generate a multi-phase clock signal in response to a received, multi-phase oscillator output signal; and
at least one clock tree coupled to the at least one phase interpolator to receive the multi-phase clock signal.

8. The apparatus of claim 1, further comprising:
a second receive data interface coupled to said transmit data interface;
a second receive clock signal interface coupled to said transmit clock signal interface;
a second transmit data interface coupled to said receive data interface;
a second transmit clock signal interface coupled to said receive clock signal interface;
a second phase lock loop having a second oscillator with a third control input, said third control input to receive a second control signal to determine a frequency of oscillation of an output signal of said second oscillator that is presented on an output of said second oscillator, said output of said second oscillator coupled to said second data transmit interface and said second transmit clock signal interface to respectively transmit from said second data transmit and second transmit clock signal interfaces said received data signal and said received clock signal synchronously with said output signal of said second oscillator;
a reference clock signal line that flows to both said first and second phase lock loops;
a second slave delay line having an input coupled to said second receive clock interface to receive said transmitted clock signal and having a fourth control input that is coupled to said third control input to receive said second control signal, said second slave delay line to delay said transmitted clock signal in accordance with said second control signal, said second slave delay line having an output coupled to said second received data interface to receive said transmitted data signal synchronously with said second slave delay line's output signal.

9. A method comprising:
adjusting, with a phase locked loop (PLL), a control parameter that determines a frequency of oscillation of said PLL's oscillator output signal;
adjusting a phase of the oscillator output signal with a phase interpolator to create a phase interpolator's output signal;
generating, with the PLL's oscillator output signal or the phase interpolator's output signal, a transmit (Tx) clock signal;
generating with the PLL's oscillator output signal or the phase interpolator's output signal a transmit data signal wherein at least one of the transmit clock signal and the transmit data signal are generated with the phase interpolator's output signal;
configuring a slave delay line according to the adjusted control parameter;
generating, by the slave delay line, a delayed receive (Rx) clock signal from a received clock signal; and
sampling received data according to the delayed Rx clock signal.

10. The method of claim 9, wherein the Tx clock signal is a multiphase transmit clock signal.

11. The method of claim 9, wherein generating the delayed receive clock comprises:
setting delay buffers of the slave delay line according to the adjusted control parameter.

12. The method of claim 9, wherein the delayed receive clock is a multi-phase signal.

13. A system comprising:
a processor;
a system memory;
a memory controller coupled between the processor and the system memory, the memory controller comprising an interface, the interface comprising:
a data transmit interface to transmit a transmitted data signal from the interface;
a transmit clock signal interface to transmit a transmitted clock signal from the interface;
a phase locked loop (PLL) having an oscillator with a first control input, said first control input to receive a control signal to determine a frequency of oscillation of an output signal of said oscillator that is presented on an output of said oscillator, said output of said oscillator coupled to said data transmit interface and said transmit clock signal interface to respectively transmit from said data transmit and transmit clock signal interfaces said transmitted data signal and said transmitted clock signal synchronously with said output signal of said oscillator;
a receive clock signal interface to receive a received clock signal;
a receive data interface to receive a received data signal;
a slave delay line having an input coupled to said receive clock signal interface to receive said received clock signal and having a second control input that is coupled to said first control input to receive said control signal, said slave delay line to delay said received clock signal in accordance with said control signal, said slave delay line having an output to provide a delayed received clock signal, said output coupled to said received data interface to receive said received data signal synchronously with said delayed received clock signal;

a first phase interpolator between the oscillator output and at least one of the data transmit interface and transmit clock signal interface.

14. The system of claim 13 wherein said system memory comprises a second interface comprising:
- a second data transmit interface to transmit the received data signal;
- a second transmit clock signal interface to transmit the received clock signal;
- a second phase locked loop (PLL) having a second oscillator with a second control input, said second control input to receive a second control signal to determine a frequency of oscillation of an output signal of said second oscillator that is presented on an output of said second oscillator, said output of said second oscillator coupled to said second data transmit interface and said second transmit clock signal interface to respectively transmit from said second data transmit and second transmit clock signal interfaces said received data signal and said received clock signal synchronously with said output signal of said second oscillator;
- a reference clock signal line coupled to both said PLL and said second PLL;
- a second receive clock signal interface to receive said transmitted clock signal;
- a second receive data interface to receive said transmitted data signal;
- a second slave delay line having an input coupled to said receive clock interface to receive said received clock signal and having a second control input that is coupled to said first control input to receive said control signal, said slave delay line to delay said received clock signal in accordance with said control signal, said slave delay line having an output to provide a delayed received clock signal, said output coupled to said received data interface to receive said received data signal synchronously with said delayed received clock signal.

* * * * *